United States Patent
Baltar et al.

(10) Patent No.: US 10,284,638 B2
(45) Date of Patent: May 7, 2019

(54) AUTONOMOUS AND ADAPTIVE MONITORING OF WORKLOADS

(71) Applicant: International Business Machines Corporation, Armonk, NY (US)

(72) Inventors: Alexandre D. Baltar, Sao Paulo (BR); Marcos Vinicius Landivar Paraiso, Sao Paulo (BR); Edson Gomes Pereira, Sao Paulo (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/169,819

(22) Filed: Jun. 1, 2016

(65) Prior Publication Data
US 2017/0353543 A1 Dec. 7, 2017

(51) Int. Cl.
G06F 15/177 (2006.01)
H04L 29/08 (2006.01)
H04L 12/24 (2006.01)

(52) U.S. Cl.
CPC ........ *H04L 67/1031* (2013.01); *H04L 41/046* (2013.01); *H04L 41/0816* (2013.01)

(58) Field of Classification Search
CPC ............... H04L 67/1031; H04L 41/046; H04L 41/0816
(Continued)

(56) References Cited

U.S. PATENT DOCUMENTS 8,769,346 B2    7/2014  Sijelmassi
9,800,655 B2 *  10/2017 Haskins ................ G06F 9/5011
(Continued)

FOREIGN PATENT DOCUMENTS

WO    2014126639 A1    8/2014
WO    2015037975 A1    3/2015
WO    2015084638 A1    6/2015

OTHER PUBLICATIONS

Katsaros et al., "A Self-adaptive hierarchical monitoring mechanism for Clouds", Journal of Systems and Software vol. 85, Issue 5, May 2012, Abstract Only, Copyright © 2011 Elsevier B.V., 3 pages.
(Continued)

*Primary Examiner* — Michael Won
*Assistant Examiner* — Atta Khan
(74) *Attorney, Agent, or Firm* — Andrew Aubert

(57) ABSTRACT

As disclosed herein a computer-implemented method includes determining an initial workload configuration corresponding to a workload and requesting a new custom monitoring agent and a new custom monitoring profile corresponding to the initial workload configuration, and determining updated monitor tuning information corresponding to the workload. The method further includes updating one or more monitoring thresholds according to updated monitor tuning information responsive to determining the workload configuration has changed, requesting a new monitoring agent that includes a monitor corresponding to a changed workload configuration, and installing the new monitoring agent in the workload. Also disclosed herein a computer-implemented method includes receiving a request from a requester for a new monitoring agent corresponding to a workload, and creating the new monitoring agent according to a custom monitoring profile. The method further includes providing the new monitoring agent to the requester. A computer system and computer program product are also disclosed herein.

12 Claims, 8 Drawing Sheets

(58) Field of Classification Search
USPC .......................................................... 709/221
See application file for complete search history.

(56) References Cited

U.S. PATENT DOCUMENTS

| | | | |
|---|---|---|---|
| 2005/0182582 A1* | 8/2005 | Chen ................... | G06F 11/3433 |
| | | | 702/108 |
| 2010/0306767 A1* | 12/2010 | Dehaan ......................... | 709/204 |
| 2012/0239739 A1 | 9/2012 | Manglik et al. | |
| 2012/0259960 A1 | 10/2012 | Sharma et al. | |
| 2013/0159501 A1* | 6/2013 | Meier ................... | G06F 9/5083 |
| | | | 709/224 |
| 2014/0040656 A1 | 2/2014 | Ho et al. | |
| 2014/0122850 A1* | 5/2014 | Duron ....................... | G06F 1/24 |
| | | | 713/1 |
| 2015/0154039 A1* | 6/2015 | Zada ................... | G06F 9/45533 |
| | | | 718/101 |
| 2016/0321098 A1* | 11/2016 | Hassine .............. | G06F 9/45558 |
| 2017/0195192 A1* | 7/2017 | Hanson ............... | H04L 41/5054 |

OTHER PUBLICATIONS

Mell et al., "The NIST Definition of Cloud Computing", NIST National Institute of Standards and Technology, Special Publication 800-145, Sep. 2011, 7 pages.

* cited by examiner

US 10,284,638 B2

AUTONOMOUS AND ADAPTIVE MONITORING OF WORKLOADS

BACKGROUND

The present invention relates to workload monitoring, and more particularly to autonomous and adaptive monitoring of workloads.

Using and depending on computing devices is becoming more common in the daily life of individuals. With the continual growth of digital information in the world, there is an ever increasing reliance on computing devices and services (e.g., on-premise computing services and cloud computing services). As individuals become more dependent on computing services (e.g., texting, social media sites, online shopping services, online banking services, audio services, video service, etc.), reliability and availability of the services has become a priority for the corporations providing services. To maintain high levels of reliability and availability, corporations may use monitors to analyze specific hardware and software components of a system in an attempt to detect potential malfunctions prior to the malfunction actually occurring.

SUMMARY

As disclosed herein a computer-implemented method includes determining an initial workload configuration corresponding to a workload and requesting a new custom monitoring agent and a new custom monitoring profile corresponding to the initial workload configuration, and determining updated monitor tuning information corresponding to the workload. The method further includes updating one or more monitoring thresholds according to the updated monitor tuning information responsive to determining the workload configuration has changed, requesting a new monitoring agent that includes a monitor corresponding to a changed workload configuration, and installing the new monitoring agent in the workload.

As disclosed herein a computer-implemented method includes receiving a request from a requester for a new monitoring agent corresponding to a workload, and creating the new monitoring agent according to a custom monitoring profile. The method further includes providing the new monitoring agent to the requester.

As disclosed herein, a computer system includes one or more computer processors, one or more computer readable storage media, and program instructions stored on the one or more computer readable storage media. The program instructions include instructions for determining an initial workload configuration corresponding to a workload and requesting a new custom monitoring agent and a new custom monitoring profile corresponding to the initial workload configuration, and determining updated monitor tuning information corresponding to the workload. The program instruction further include instructions for updating one or more monitoring thresholds according to the updated monitor tuning information, responsive to determining the workload configuration has changed, requesting a new monitoring agent that includes a monitor corresponding to a changed workload configuration, and installing the new monitoring agent in the workload.

As disclosed herein, a computer program product includes one or more computer readable storage media and program instructions stored on the one or more computer readable storage media. The program instructions include instructions for determining an initial workload configuration corresponding to a workload and requesting a new custom monitoring agent and a new custom monitoring profile corresponding to the initial workload configuration, and determining updated monitor tuning information corresponding to the workload. The program instruction further include instructions for updating one or more monitoring thresholds according to the updated monitor tuning information, responsive to determining the workload configuration has changed, requesting a new monitoring agent that includes a monitor corresponding to a changed workload configuration, and installing the new monitoring agent in the workload.

DETAILED DESCRIPTION

Figure 1:
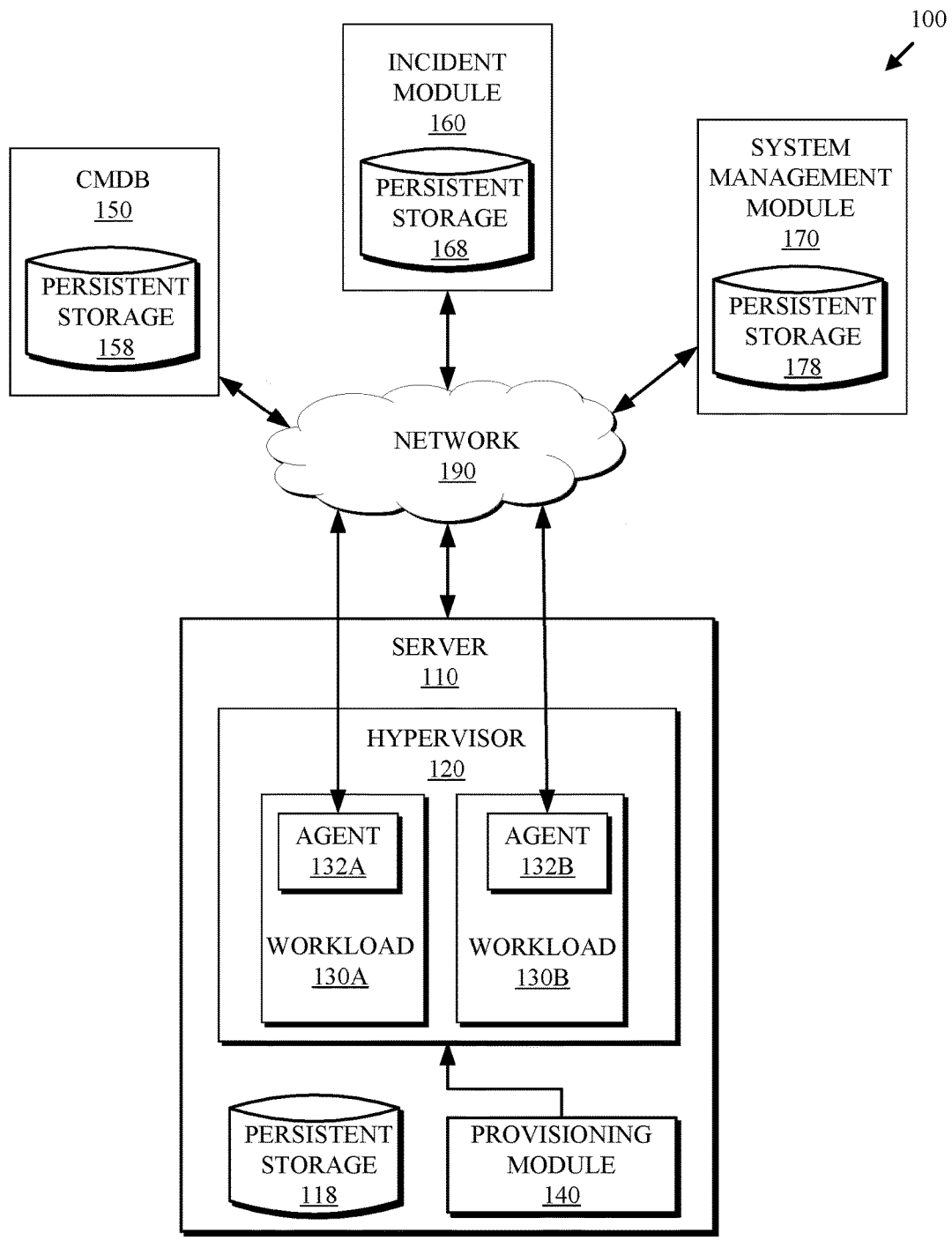
FIG. 1 is a functional block diagram depicting a computing environment, in accordance with at least one embodiment of the present invention.

Corporations rely on computers to manage and maintain many aspects of their day to day business operations. A workload may be defined as a computing device that comprises a collection of hardware and software configured to provide a service. The corporations may use on-premise computing offerings, cloud computing offerings, or a combination of the two to provision a workload. Regardless of where a workload is located, the corporation may wish to monitor the operation of the workload (e.g., both hardware and software operations) to assure the workload is performing efficiently.

When deploying monitoring agents into workloads, an administrator identifies a standard (previously defined) set of monitoring agents that are deployed on a specific type of workload. For example: (i) a Linux workload may deploy monitor agents to monitor CPU, disk space, and memory; (ii) a database workload may deploy monitor agents to monitor log archives, instances, and DB2 file systems; and (iii) additionally a standard set of monitor agents corresponding to a specific software package (e.g., an OS or an application) may be deployed. Depending on the workload configuration, there may be multiple monitoring agents deployed on the workload, and each monitor agent may have a monitoring profile that includes configurable settings (e.g., threshold settings) corresponding to the monitor.

The corporation may have multiple workloads, each using multiple previously defined monitoring agents, and each having a monitoring profile. Keeping track of each monitoring agent and profile on each workload can become a very intense, time consuming job, that may be prone to oversights and errors. Monitor profiles may include threshold values (e.g., low memory threshold=2 Gig free, Disk utilization=75%, etc). If a workload configuration changes (e.g., reducing available memory from 8 Gig to 4 Gig), the memory monitor may generate numerous alerts indicating that a low memory condition exists (e.g., less than 2 Gig of the installed 4 Gig is free). As a result, the administrator may have to manually alter threshold value in the monitor profile corresponding to the memory monitor. After making the change, the administrator will also have to remember that the memory monitor profile has been altered and the monitoring agent is no longer performing standard monitoring functions. Additionally, if the workload configuration is altered by adding or removing a software package, the administrator would have to be aware of the changed configuration, and manually deploy or remove monitoring agents.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

FIG. 1 is a functional block diagram depicting a computing environment 100, in accordance with at least one embodiment of the present invention. Computing environment 100 includes server 110, configuration management data base (CMDB) 150, incident module 160, and system management module 170 that communicate with each other over network 190. Server 110, configuration management data base (CMDB) 150, incident module 160, and system management module 170 can be computing devices such as smart phones, tablets, desktop computers, laptop computers, specialized computer servers, or the like that are capable of processing instructions and communicating over network 190.

Server 110 is a host for filling workload requests and may be either an on-premise computing server or a cloud computing server. A workload may be any virtualized computing environment that can be provisioned from server 110 (e.g., a virtual machine, a container, a physical server, a cloud instance, etc.). Server 110 includes persistent storage 118, hypervisor 120, and provisioning module 140. Provisioning module 140 may receive a request for a workload from a user and coordinate, with hypervisor 120, the allocation of the requested workload 130 from server 110. Hypervisor 120 manages workloads (e.g., workloads 130A and 130B) that are provisioned on server 110. In the depicted embodiment, provisioning module 140 is included on server 110, however provisioning module 140 can reside in any location that is capable of communicating with server 110 over network 190.

Workloads 130A and 130B include agents 132A and 132B, respectively. Agents 132 are monitoring agents responsible for managing the monitoring activities for the workload on which they reside. Additionally, agents 132 may detect changes to the workload configuration. In some embodiments, agents 132 alter the customized monitoring profile to accommodate the configuration change. In some embodiments, agents 132 request a new or updated agent from system management module 170.

When workload 130A is initially allocated (provisioned), agent 132A may be a generic monitoring agent. The purpose of the generic agent 132A is to gather configuration details corresponding to workload 130A (e.g., type of workload, operating system, number of CPU's, disk space, applications installed, etc.) and request, from system management module 170, a new (replacement) monitoring agent that includes monitors and a monitoring profile corresponding to the gathered configuration details. In some embodiments, the configuration information corresponding to workload 130A is provided during the provisioning operation. In other embodiments, generic agent 132A gathers the configuration information corresponding to workload 130A by issuing system commands to gather information, and connecting to CMDB 150 to retrieve information corresponding to the configuration of workload 130A.

When the new agent is received from system management module 170, generic agent 132A may initiate an operation to uninstall the current (generic) agent 132A and deploy the new agent 132A. The new agent 132A may include monitors and a custom monitoring profile corresponding to the configuration of workload 130A.

In addition to managing the individual monitors that may be active on workload 130A, agent 132 continually analyzes incidents reported by any of the monitors (e.g., high CPU usage alerts). Incidents may be collected and retained on persistent storage 168 by incident module 160. Agent 132A may discover an increase in high CPU usage incident reports corresponding to workload 130A. Agent 132 may determine that an increase of high CPU usage alerts are the result of a short lived demand for CPU by a critical application and the alerts can be avoided if the high CPU usage alert threshold is updated from 90% in use to 95% in use. Agent 132A may automatically update the threshold value in the monitoring profile without requiring manual input from a system administrator.

Agent 132A may also continually analyze the overall configuration of workload 130A. If agent 132A detects a configuration change (e.g., a new application deployed or the removal of an applications), then agent 132 may provide the information on the changed configuration to system management module 170 and request a new or updated monitoring agent. If system management module 170 provides an update to the existing agent 132A, then agent 132A applies the update. If system management module 170 provides a new (replacement) monitoring agent, then agent 132A may initiate an operation to uninstall the current agent 132A and deploy the new agent 132A. The new or updated agent 132A may collect business information (e.g., criticality of an application, operation hours, maintenance window, etc) from CMDB 150, and use the information to update the monitoring profile and optimally tune monitoring thresholds corresponding to the monitors active for workload 130A.

When system management module 170 receives a request for a new or updated agent, the resulting updated or new agent may be created based on information received in the request from an existing agent. In some embodiments the request includes a complete description of the workload configuration, enabling system management module 170 to create a new/replacement agent. In other embodiments, the request includes only changed and/or updated information corresponding to the previously created agent. System management module 170 retrieves information corresponding to the previously created agent from persistent storage 178 and merges the new update information with the previous information to determine the new configuration.

System management module 170 creates a single agent that matches the information received in the request (e.g., only the monitors matching the information in the request will be included in the agent). In addition to a single agent, system management module 170 also creates a single custom monitoring profile corresponding to the single agent. A single agent and a single custom monitoring profile eliminate clutter and confusion that may be experienced with the presence of multiple agents and profiles.

CMDB 150 may be a repository that acts as a data warehouse for information technology (IT) installations. CMDB 150 may include data corresponding to a collection of IT assets (e.g., installed applications) included in a workload (e.g., workload 130A) and its related business information. The information in CMDB 150 may be saved during application deployment, and later referenced by other resources such as system management module 170. The information may be stored on persistent storage 158 and may conform to any suitable storage architecture known in the art, such as a file, a relational database, an object-oriented database, and/or one or more tables.

Incident Module 160 may be a module responsible for receiving and retaining information corresponding to events/alerts from monitors operating on workloads 130A and 130B. The information may be retained on persistent storage 168. The information may be accessed by other resources (e.g., agent 132A) to determine the health of workload 130A or by end users to determine the overall health of the IT environment as a whole.

Persistent storage 118, 158, 168, and 178 may be any non-volatile storage device or media known in the art. For example, persistent storage 118, 158, 168, and 178 can be implemented with a tape library, optical library, solid state storage, one or more independent hard disk drives, or multiple hard disk drives in a redundant array of independent disks (RAID). Similarly, data on persistent storage 118, 158, 168, and 178 may conform to any suitable storage architecture known in the art, such as a file, a relational database, an object-oriented database, and/or one or more tables.

Server 110, configuration management data base (CMDB) 150, incident module 160, system management module 170, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between server 110, configuration management data base (CMDB) 150, incident module 160, and system management module 170 in accordance with at least one embodiment of the present invention.

Figure 2:
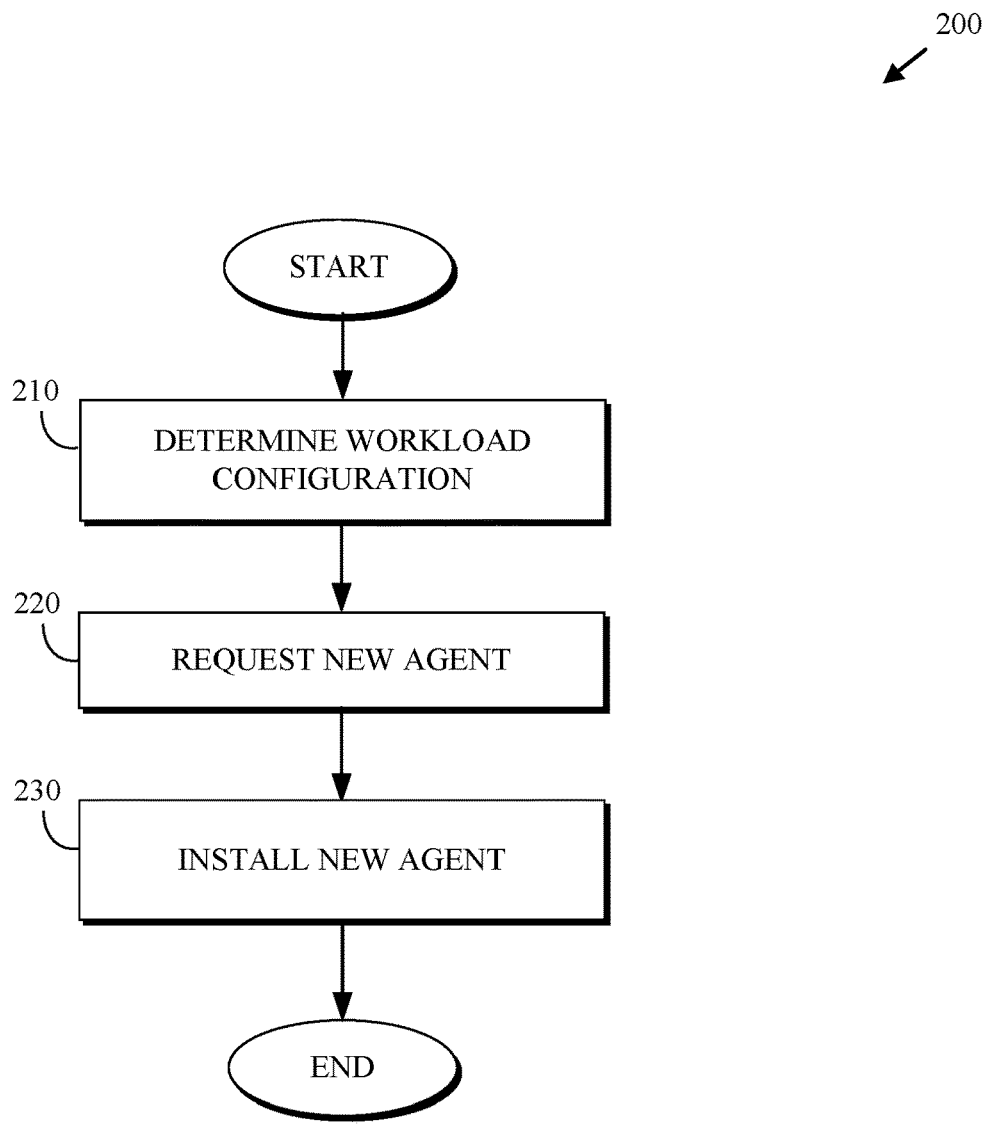
FIG. 2 is a flowchart depicting a generic agent method, in accordance with at least one embodiment of the present invention.

FIG. 2 is a flowchart depicting a generic agent method 200, in accordance with at least one embodiment of the present invention. As depicted, generic agent method 200 includes determining (210) a workload configuration, requesting (220) a new agent, and installing (230) the new agent. Generic agent method 200 enables a generic monitoring agent (e.g., agent 132) to determine the configuration of a workload (e.g., workload 130) and request a new customized monitoring agent that is capable of monitoring the workload as the workload is currently configured.

Determining (210) a workload configuration may include agent 132 identifying both the hardware and software configuration corresponding to a newly created workload on which agent 132 is running (i.e., the host workload). In some embodiments, agent 132 is a generic agent that has the primary objective of requesting a fully functioning customized agent to manage monitoring operations on the host workload. In other embodiments, agent 132 is a functioning monitoring agent that continues to determine the current configuration of the host workload. In some embodiments, the configuration is included as part of the workload provisioning operation. In other embodiments, generic agent 132 performs system scans on the host workload to obtain configuration information, and queries CMDB 150 to retrieve additional information corresponding to IT assets that are deployed on the host workload and business related information. In some embodiments, the workload configuration is retained on persistent storage 118. In other embodiments, the workload configuration is retained in CMDB 150.

Requesting (220) a new agent may include agent 132 requesting from system management module 170 a customized monitoring agent and customized monitoring profile. Agent 132 may also provide system management module 170 with configuration information corresponding to the host workload. In some embodiments, agent 132 provides to system management module 170 with a skeleton monitoring profile that includes configuration items, but no threshold values. In other embodiments, agent 132 provides system management module 170 with a list of configuration items to be monitored by the requested agent.

Installing (230) the new agent may include generic agent 132 initiating an operation that uninstalls the outdated version of agent 132 and then installs the new version of agent 132. In some embodiments the uninstall and the install operations are performed by a self-extracting executable that removes the outdated agent and installs the new agent. Uninstalling the current instance of agent 132 may include stopping any running processes associated with the outdated agent, removing the outdated agent, the outdated monitoring profile, and each monitor associated with the outdated agent. Installing the new agent may include deploying the new agent, installing the new custom profile, deploying each individual monitor that the new agent is configured to manage. Lastly, the monitoring operations are initialized.

Figure 3:
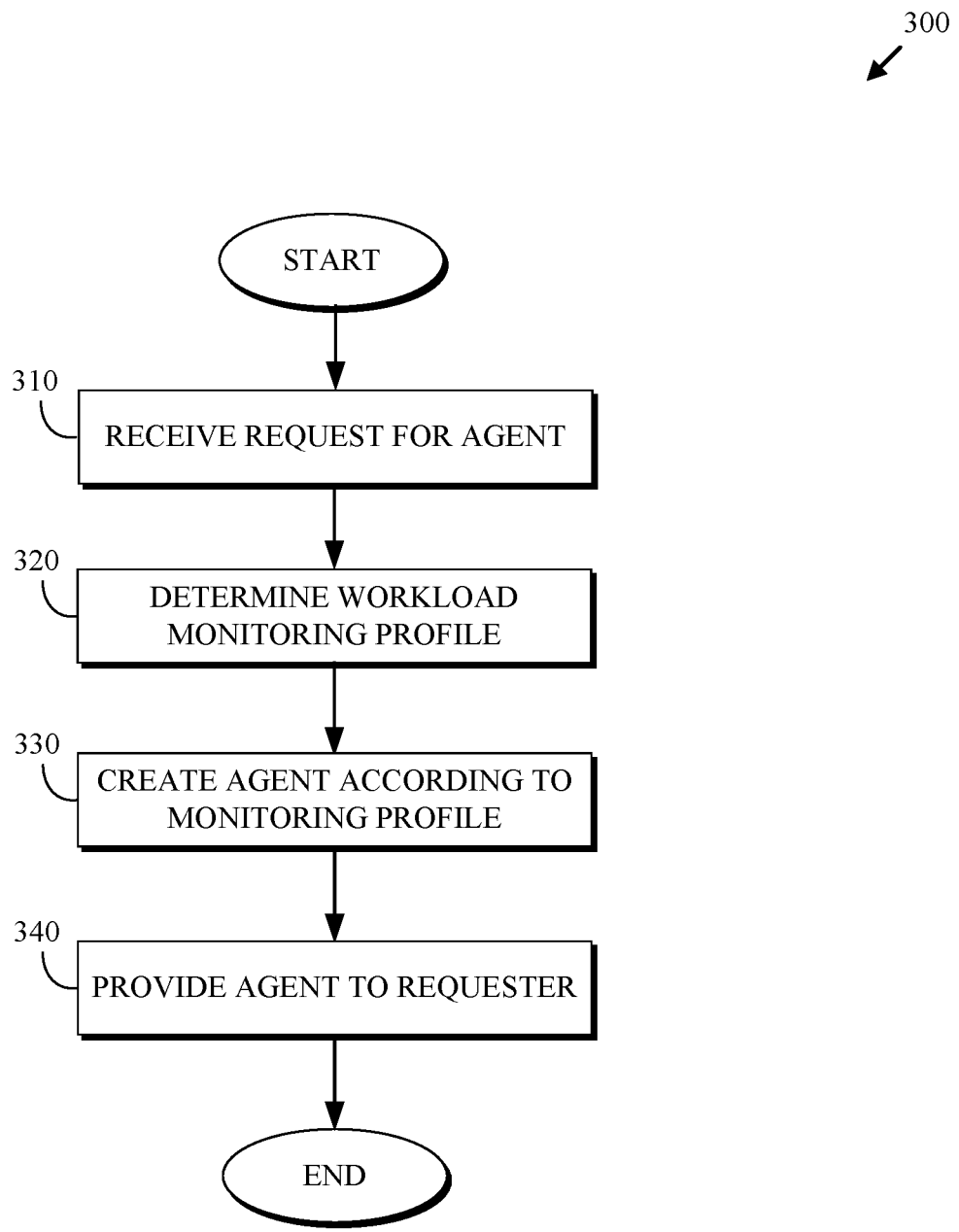
FIG. 3 is a flowchart depicting an agent creation method, in accordance with at least one embodiment of the present invention.

FIG. 3 is a flowchart depicting an agent creation method 300, in accordance with at least one embodiment of the present invention. As depicted, agent creation method 300 includes receiving (310) a request for an agent, determining (320) a workload monitoring profile, creating (330) an agent, and providing (340) the agent to the requester. Agent creation method 300 enables the creation of a custom monitoring agent and custom monitoring profile that is created specifically for the requester.

Receiving (310) a request for an agent may include system management module 170 receiving a request to either update an existing agent, or to create a new agent. The request may be received from agent 132A over network 190.

A request for a new agent may include a list of configuration items that are to be monitored by the agent. In some embodiments, an update request includes a complete listing of configuration items included in the host workload. In other embodiments, an update request includes just a listing of the changed (e.g., added, updated, and/or deleted) configuration items.

Determining (320) a workload monitoring profile may include system management module 170 determining if the request is for an updated agent or a new agent. If the request is for a new agent, system management module 170 may convert the list of configuration items included in the request into a new monitoring profile. In some embodiments, system management module 170 retrieves a saved copy of the current monitoring profile from persistent storage 178. If the request is for an update to an existing agent and the request includes complete list of configuration items, then system management module 170 may compare the received list of configuration items with the configuration items in the retrieved monitoring profile to determine what has changed. If the request is for an update to an existing agent and the request includes a listing of only the changed configuration items then system management module 170 may create an updated monitoring profile using the retrieved monitoring profile as a beginning baseline.

Creating (330) an agent may include system management module 170 collecting all required monitor modules (e.g., modules designed to monitor a specific configuration item) necessary to perform monitoring operations on each component identified in the monitoring profile. In some embodiments, individual monitoring modules are be retrieved from persistent storage 178. Additionally, system management module 170 may query CMDB 150 to determine appropriate monitoring configuration settings and threshold values to be included in the monitoring profile. Finally the monitoring agent that manages the individual monitors and detects configuration changes on the host workload is created.

Providing (340) the agent to the requester may include system management module 170 creating a self-extracting package including the agent, monitors and the monitoring profile. In some embodiments, system management module 170 sends the package directly to the requester over network 190. In other embodiments, system management module 170 stores the package on persistent storage 178 of System Management Module 170 and the requester can retrieve the package at an optimal time.

Figure 4:
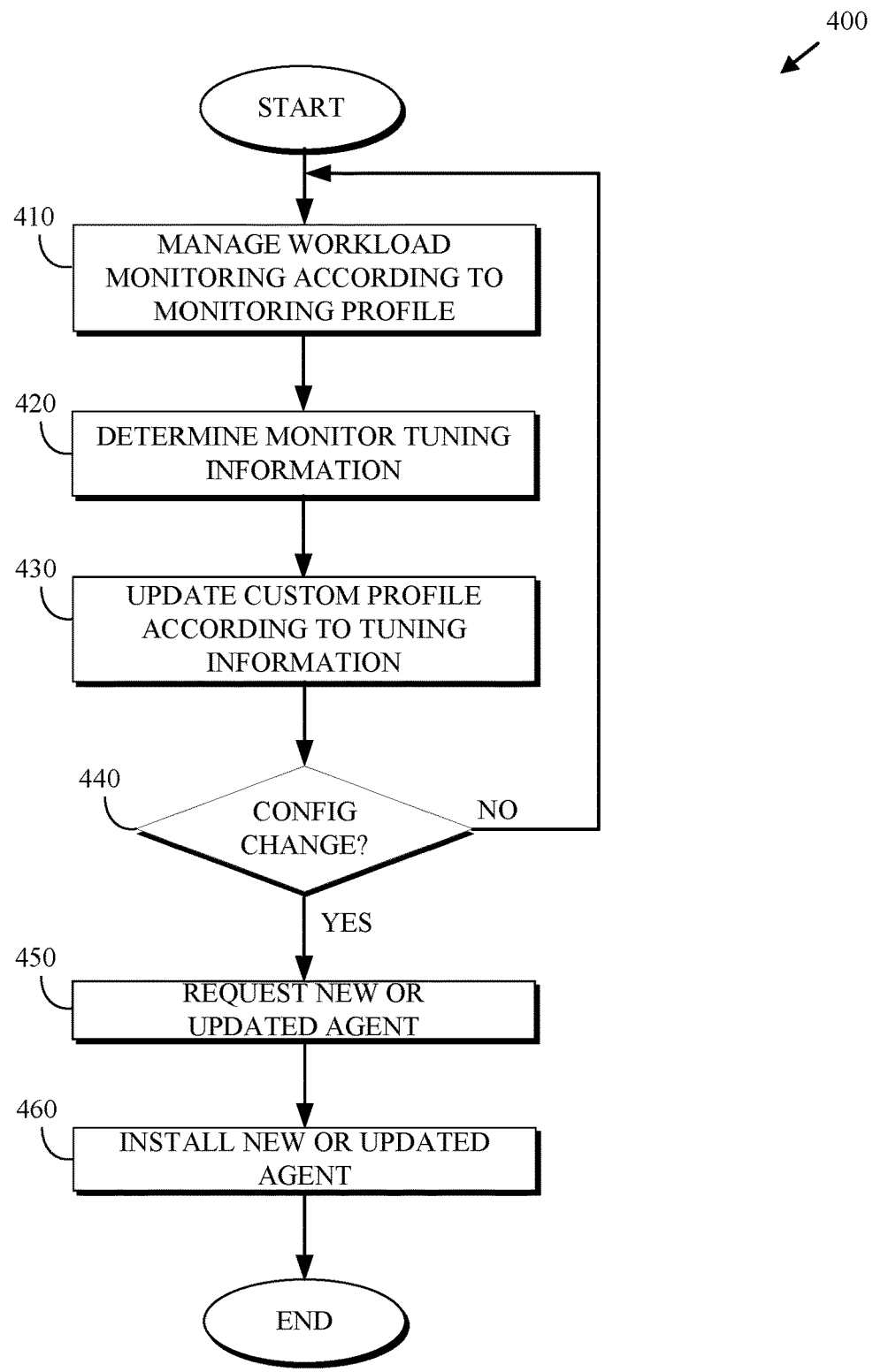
FIG. 4 is a flowchart depicting a workload analysis method, in accordance with at least one embodiment of the present invention.

FIG. 4 is a flowchart depicting a workload analysis method 400, in accordance with at least one embodiment of the present invention. As depicted, workload analysis method 400 includes managing (410) workload monitors, determining (420) monitor tuning information, updating (430) a custom profile, determining (440) whether the configuration has changed, requesting (450) a new agent, and installing (460) the new agent. Workload analysis method 400 enables a monitoring agent (e.g., agent 132) to tune a custom profile according to runtime analysis, and request a new or updated agent responsive to configuration changes to a workload.

Managing (410) workload monitors may include agent 132 continually verifying that all monitors associated with the host workload are operational and performing as expected. If a monitor is not operational, agent 132 may try to analyze and repair the nonoperational monitor. If issues are discovered with a monitor, agent 132 may notify incident module 160 of the incident as a way to maintain (e.g., log) a record of the malfunction.

Determining (420) monitor tuning information may include agent 132 querying CMDB 150 to retrieve business information corresponding to configuration items that are to be monitored. The business information may include, for example, criticality of a server or application, support hours, maintenance window, and scheduled run-times. Additionally, agent 132 may query the incident module to obtain and analyze tickets (i.e., recorded incidents from monitor alerts) that correspond to monitors managed by agent 132. In some embodiments, agent 132 continuously queries and analyzes monitoring information. In other embodiments, agent 132 queries and analyzed monitoring information according to a previously determined schedule.

Updating (430) a custom profile may include agent 132 determining that a monitor is not operating optimally, and tuning the monitor by updating runtime parameters (e.g., threshold values, criticality values, etc.) in the monitoring profile. Additionally, agent 132 may detect an excessive number of low memory alerts corresponding to a memory monitor. However, agent 132 may also determine that the alerts are short lived and only occur when a known memory intensive application is running. As a result, agent 132 may update the low memory alert from 2 Gig of 16 Gig available to 1 Gig of 16 Gig available. Automatically tuning monitoring thresholds may alleviate false positive alerts.

Determining (440) whether the configuration has changed may include agent 132 rerunning the workload configuration operation 210 (of FIG. 2) to determine the current (hardware and software) configuration of the workload. In some embodiments, agent 132 retrieves the prior workload configuration from persistent storage 118. In other embodiments, agent 132 retrieves the prior workload configuration from CMDB 150. The new workload configuration may be compared to the prior workload configuration to determine if the workload configuration has changed (e.g., a new application has been deployed, or an application has been removed). If the workload configuration has changed, then workload analysis method 400 proceeds to the request a new agent operation 450. Otherwise, workload analysis method 400 iterates to the manage workload operation 410.

Requesting (450) a new or updated agent may include agent 132 requesting from system management module 170 a customized monitoring agent (either new or updated) and customized monitoring profile. Agent 132 may also provide system management module 170 with configuration information corresponding to the host workload. If the request is for a new agent, then the configuration information may include all configuration items included in the host workload. If the request is for an updated agent, then the configuration information may include a list of only the changed (e.g., added, updated, and/or deleted) configuration items.

Installing (460) the new or updated agent may include agent 132 initiating a self-extracting executable that performs the update or replace operation. If an update to the existing agent is being installed, then the self-installing operation does not uninstall the existing agent. The installation may selectively uninstall no longer needed modules, install new or replacement modules, and update other modules.

If a new (replacement) agent is being installed, then the self-installing operation may uninstall the outdated version of agent 132 and then install the new version of agent 132. Uninstalling the current instance of agent 132 may include stopping any running processes associated with the outdated agent, removing the outdated agent, removing the outdated monitoring profile, and removing each monitor associated with the outdated agent. Installing the new agent may include deploying the new agent, installing the new custom profile, deploying each individual monitor that the new agent is configured to manage. Lastly, the monitoring operations are initialized.

After the agent has been successfully installed, agent 132 may verify tuning information and update the custom profile similar to the determining monitor tuning information operation 420 and the updating a custom profile operation 430.

Figure 5:
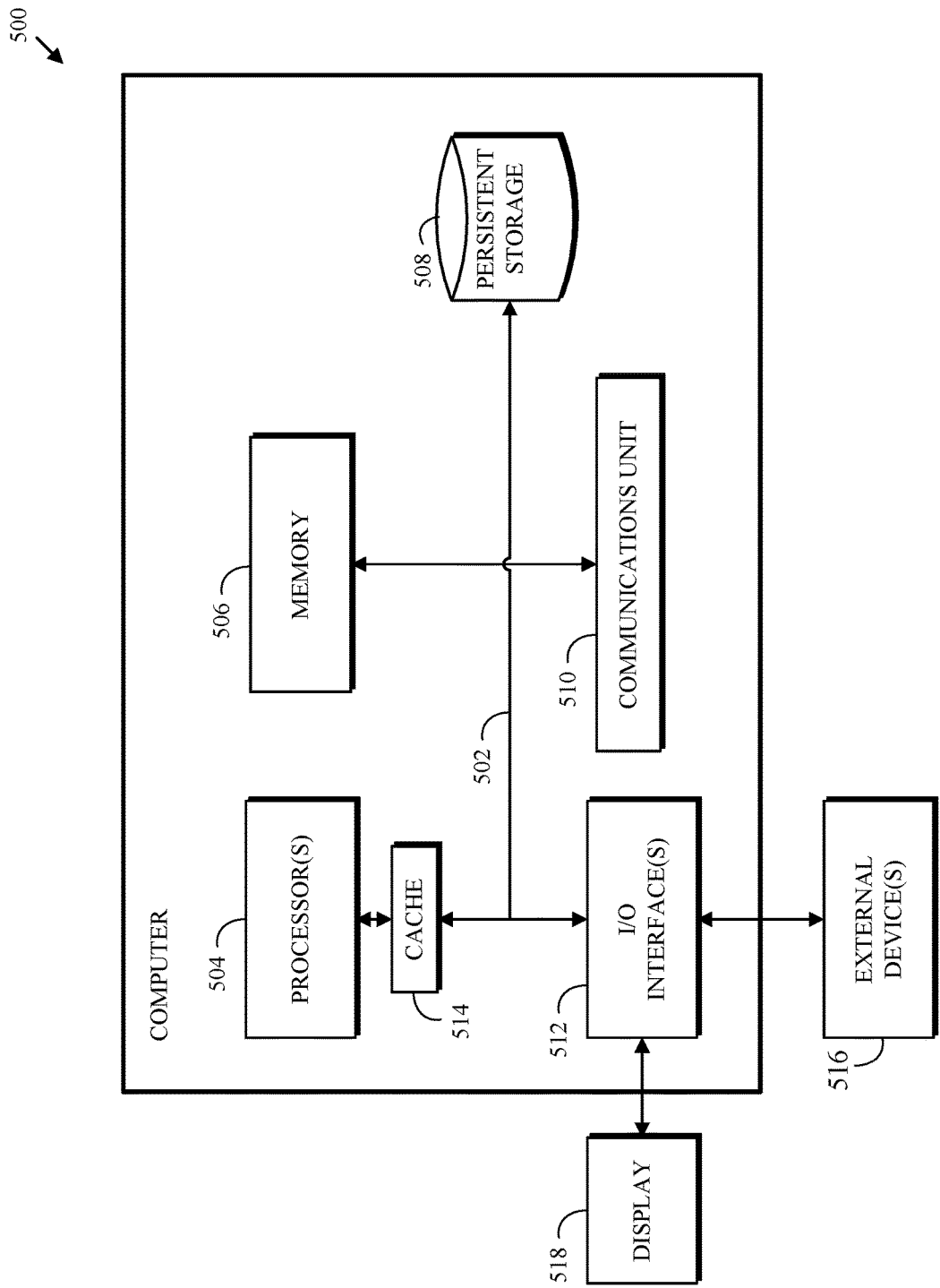
FIG. 5 is a functional block diagram depicting various components of one embodiment of a computer suitable for executing the methods disclosed herein.

FIG. 5 depicts a functional block diagram of components of a computer system 500, which is an example of systems such as server 110 within computing environment 100 of FIG. 1, in accordance with at least one embodiment of the present invention. It should be appreciated that FIG. 5 provides only an illustration of one implementation and does not imply any limitations with regard to the environments in which different embodiments can be implemented. Many modifications to the depicted environment can be made.

Server 110 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., generic agent method 200, agent creation method 300, and workload analysis method 400 are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of server 110. In these examples, communications unit 510 includes one or more network interface cards. Communications unit 510 may provide communications through the use of either or both physical and wireless communications links. Program instructions and data used to practice embodiments of generic agent method 200, agent creation method 300, and workload analysis method 400 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
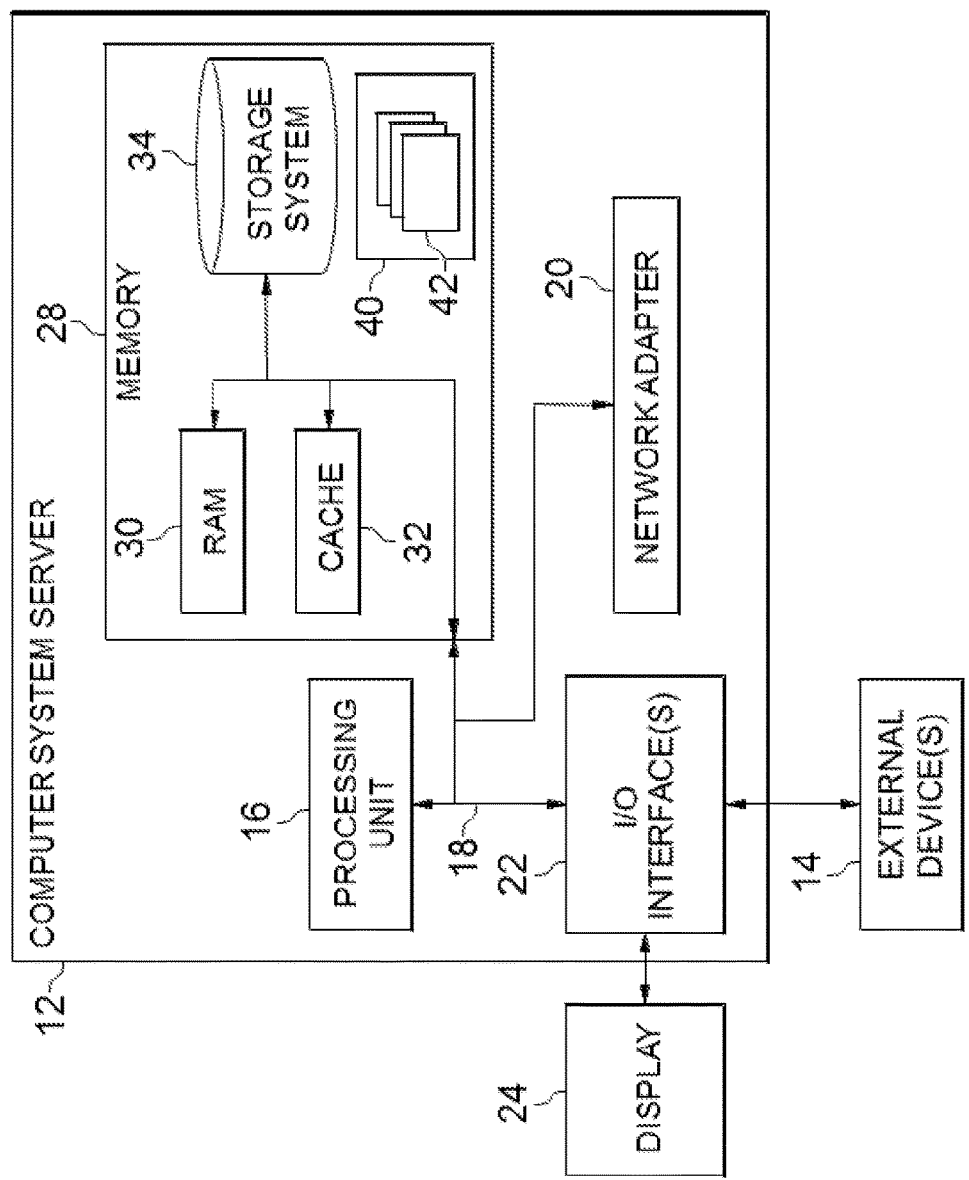
FIG. 6 is a block diagram depicting a cloud computing node, according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
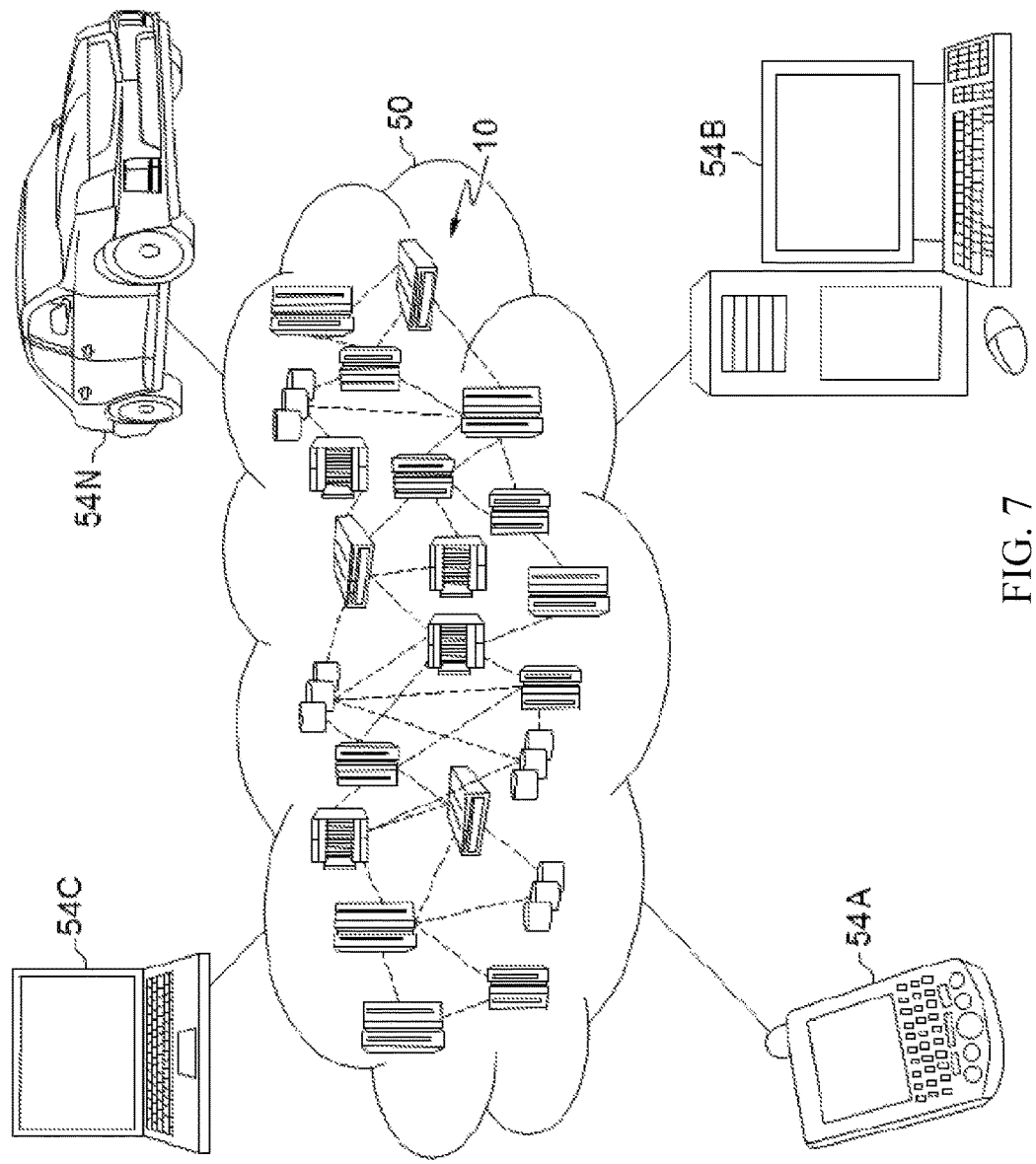
FIG. 7 is a schematic diagram depicting a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
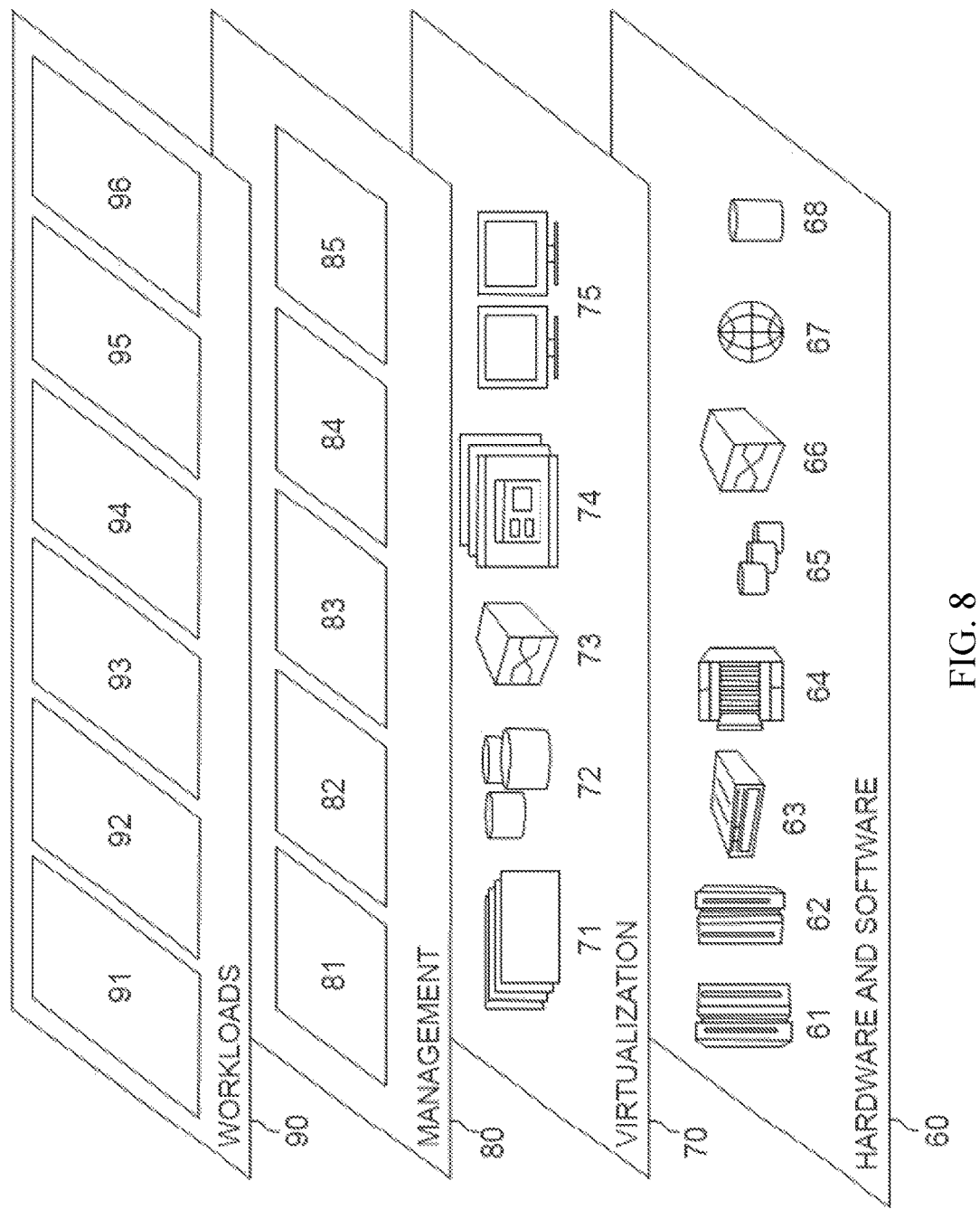
FIG. 8 is a schematic diagram depicting abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
   creating a workload;
   identifying a software/hardware configuration of the workload, including what software is installed in the workload and what hardware is tasked to the workload;
   receiving a workload business information data set including information indicative of criticality, support hours, maintenance windows, and scheduled run-times with respect to the workload;
   determining a selected monitoring agent from a plurality of monitoring agents, based, at least in part, on the software/hardware configuration of the workload and the workload business information data set, where the software/hardware configuration indicates what software and hardware requires monitoring, and the workload business information data set indicates thresholds for the monitoring;

receiving an incident ticket data set including information indicative of recorded incidences corresponding to monitors of the selected monitoring agent;

detecting, by the selected monitoring agent, a change of hardware specifications based, at least in part, on the incident ticket data set; and responsive to detecting the change of hardware specifications of the workload, intermittently tuning the selected monitoring agent based, at least in part, on the detected change of hardware specifications.

2. The method of claim 1, wherein individual monitoring modules are retrieved from persistent storage.

3. The method of claim 1, further comprising:

creating a self-extracting package, the self-extracting package including a tuned selected monitoring agent; and storing the self-extracting package on a persistent storage for later retrieval.

4. The method of claim 3, further comprising:

retrieving the self-extracting package from the persistent storage;

stopping any running processes associated with the selected monitoring agent; and installing the tuned selected monitoring agent.

5. A computer program product (CPP) comprising:

a machine readable storage device; and computer code stored on the machine readable storage device, with the computer code including instructions for causing a processor(s) set to perform operations including the following:

creating a workload, identifying a software/hardware configuration of the workload, including what software is installed in the workload and what hardware is tasked to the workload, receiving a workload business information data set including information indicative of criticality, support hours, maintenance windows, and scheduled run-times with respect to the workload, determining a selected monitoring agent from a plurality of monitoring agents, based, at least in part, on the software/hardware configuration of the workload and the workload business information data set, where the software/hardware configuration indicates what software and hardware requires monitoring, and the workload business information data set indicates thresholds for the monitoring, receiving an incident ticket data set including information indicative of recorded incidences corresponding to monitors of the selected monitoring agent, detecting, by the selected monitoring agent, a change of hardware specifications based, at least in part, on the incident ticket data set, and responsive to detecting the change of hardware specifications of the workload, intermittently tuning the selected monitoring agent based, at least in part, on the detected change of hardware specifications.

6. The CPP of claim 5, wherein individual monitoring modules are retrieved from persistent storage.

7. The CPP of claim 5, further comprising:

creating a self-extracting package, the self-extracting package including a tuned selected monitoring agent; and storing the self-extracting package on a persistent storage for later retrieval.

8. The CPP of claim 7, wherein the computer code further includes instructions for causing the processor(s) set to perform the following operations:

retrieving the self-extracting package from the persistent storage;

stopping any running processes associated with the selected monitoring agent; and installing the tuned selected monitoring agent.

9. A computer system (CS) comprising:

a machine readable storage device;

a processor(s) set; and computer code stored on the machine readable storage device, with the computer code including instructions for causing the processor(s) set to perform operations including the following:

creating a workload, identifying a software/hardware configuration of the workload, including what software is installed in the workload and what hardware is tasked to the workload, receiving a workload business information data set including information indicative of criticality, support hours, maintenance windows, and scheduled run-times with respect to the workload, determining a selected monitoring agent from a plurality of monitoring agents, based, at least in part, on the software/hardware configuration of the workload and the workload business information data set, where the software/hardware configuration indicates what software and hardware requires monitoring, and the workload business information data set indicates thresholds for the monitoring, receiving an incident ticket data set including information indicative of recorded incidences corresponding to monitors of the selected monitoring agent, detecting, by the selected monitoring agent, a change of hardware specifications based, at least in part, on the incident ticket data set, and responsive to detecting the change of hardware specifications of the workload, intermittently tuning the selected monitoring agent based, at least in part, on the detected change of hardware specifications.

10. The CS of claim 9, wherein individual monitoring modules are retrieved from persistent storage.

11. The CS of claim 9, wherein the computer code further includes instructions for causing the processor(s) set to perform the following operations:

creating a self-extracting package, the self-extracting package including a tuned selected monitoring agent; and storing the self-extracting package on a persistent storage for later retrieval.

12. The CS of claim 11, wherein the computer code further includes instructions for causing the processor(s) set to perform the following operations:

retrieving the self-extracting package from the persistent storage;

stopping any running processes associated with the selected monitoring agent; and installing the tuned selected monitoring agent.

* * * * *